(12) United States Patent
Okazaki et al.

(10) Patent No.: US 10,576,459 B2
(45) Date of Patent: Mar. 3, 2020

(54) PHOTOCATALYST MATERIAL

(71) Applicant: Sharp Kabushiki Kaisha, Osaka-shi, Osaka (JP)

(72) Inventors: Shinya Okazaki, Osaka (JP); Hiroyuki Nishinaka, Osaka (JP); Masakazu Matsubayashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/892,251

(22) PCT Filed: Aug. 6, 2014

(86) PCT No.: PCT/JP2014/070749
§ 371 (c)(1),
(2) Date: Nov. 19, 2015

(87) PCT Pub. No.: WO2015/025715
PCT Pub. Date: Feb. 26, 2015

(65) Prior Publication Data
US 2016/0107145 A1 Apr. 21, 2016

(30) Foreign Application Priority Data

Aug. 22, 2013 (JP) .................. 2013-172674
Jul. 25, 2014 (JP) .................. 2014-152105

(51) Int. Cl.
*B01J 23/30* (2006.01)
*B01J 23/652* (2006.01)
(Continued)

(52) U.S. Cl.
CPC ............ *B01J 23/30* (2013.01); *B01D 53/885* (2013.01); *B01J 21/063* (2013.01); *B01J 23/002* (2013.01); *B01J 23/6527* (2013.01); *B01J 23/687* (2013.01); *B01J 23/888* (2013.01); *B01J 35/004* (2013.01); *B01J 35/0006* (2013.01); *B01J 35/008* (2013.01); *B01J 37/0201* (2013.01); *B01J 37/0221* (2013.01); *B01D 2255/1023* (2013.01); *B01D 2255/20707* (2013.01); *B01D 2255/20761* (2013.01);
(Continued)

(58) Field of Classification Search
CPC ...... B01J 23/30; B01J 23/888; B01J 37/0221; B01J 23/6527; B01J 21/063; B01J 35/006; B01J 35/004; B01J 35/008
See application file for complete search history.

(56) References Cited

FOREIGN PATENT DOCUMENTS

CN 102872774 A * 1/2013
JP 2008-149312 A 7/2008
(Continued)

OTHER PUBLICATIONS

JP 2012110831A Machine Translation.*
(Continued)

*Primary Examiner* — James A Fiorito
(74) *Attorney, Agent, or Firm* — Keating & Bennett, LLP

(57) ABSTRACT

A photocatalyst material (1A) in accordance with an aspect of the present invention includes a core particle (2) and a shell layer (3) with which a whole surface of the core particle (2) is covered. The core particle (2) contains at least a tungsten oxide, and the shell layer (3) is constituted by a titanium oxide.

7 Claims, 2 Drawing Sheets

(51) Int. Cl.
   *B01J 23/888* (2006.01)
   *B01J 35/00* (2006.01)
   *B01J 37/02* (2006.01)
   *B01J 23/00* (2006.01)
   *B01J 23/68* (2006.01)
   *B01D 53/88* (2006.01)
   *B01J 21/06* (2006.01)
   *B01J 37/34* (2006.01)
   *B01J 37/03* (2006.01)

(52) U.S. Cl.
   CPC .............. *B01D 2255/20776* (2013.01); *B01D 2255/802* (2013.01); *B01D 2255/902* (2013.01); *B01D 2257/406* (2013.01); *B01D 2257/708* (2013.01); *B01D 2258/06* (2013.01); *B01D 2259/4591* (2013.01); *B01D 2259/802* (2013.01); *B01J 37/033* (2013.01); *B01J 37/343* (2013.01)

(56) References Cited

FOREIGN PATENT DOCUMENTS

| | | | |
|---|---|---|---|
| JP | 2012-110831 A | 6/2012 |
| JP | 2013-208589 A | 10/2013 |

OTHER PUBLICATIONS

JP 2008149312A Machine Translation.*
Cherng-Yuh Su, Formation of tungsten oxide encapsulated in titanium oxide nanocages by modified plasma arc gas condensation, Mar. 2007, Nanotechnology, 18, 1-5.*
CN 102872774 A (machine translation).*
Official Communication issued in International Patent Application No. PCT/JP2014/070749, dated Nov. 11, 2014.

\* cited by examiner

PHOTOCATALYST MATERIAL

TECHNICAL FIELD

The present invention relates to a visible light response type photocatalyst material.

BACKGROUND ART

In recent years, attention has been directed to (i) a photocatalyst which, by solar light or indoor illumination, absorbs environmental pollutants to decompose and remove the pollutants and (ii) a photocatalyst which, by solar light or indoor illumination, exhibits self-cleaning action against dirt adhering to a surface of the photocatalyst. Active research into such photocatalyst materials has been carried out.

Among photocatalyst materials, a titanium oxide shows high photocatalytic effect and has been widely studied. However, because a titanium oxide has a large bandgap, a titanium oxide can absorb ultraviolet light but cannot absorb visible light. Therefore, although the titanium oxide shows photocatalytic activity in response to ultraviolet light, the titanium oxide does not show photocatalytic activity in response to visible light. This prevents a photocatalyst material made of a titanium oxide from producing photocatalytic effect in an indoor environment where there exists an extremely little amount of ultraviolet light.

Meanwhile, research and development have been carried out into photocatalytic effect of photocatalyst materials made of materials other than a titanium oxide. An example of such materials is a tungsten oxide. Patent Literature 1 discloses that a tungsten oxide has a smaller bandgap compared with a titanium oxide and can therefore absorb visible light, and that it is therefore possible to use a tungsten oxide as a visible light response type photocatalyst material by causing the tungsten oxide to support a proper co-catalyst on a surface of the tungsten oxide.

Furthermore, Patent Literature 2 discloses that a tungsten oxide, which serves as a photocatalyst and has a surface(s) partially covered with a titanium oxide, has higher photocatalytic effect than a tungsten oxide which is not covered with a titanium oxide, and can therefore quickly decompose volatile aromatic compounds in a gas phase.

CITATION LIST

Patent Literature

Patent Literature 1
Japanese Patent Application Publication, Tokukai, No. 2008-149312 (Publication Date: Jul. 3, 2008)
Patent Literature 2
Japanese Patent Application Publication, Tokukai, No. 2012-110831 (Publication Date: Jun. 14, 2012)

SUMMARY OF INVENTION

Technical Problem

However, a tungsten oxide is superior to a titanium oxide in alkali solubility. Therefore, a photocatalyst material disclosed in Patent Literature 1 poses the following problem: in a case where the photocatalyst material is used to decompose a basic gas such as ammonia or in a case where the photocatalyst material is used in contact with a basic cleaning agent, the photocatalyst material dissolves or changes in quality, and it is therefore not possible to gain sufficient photocatalytic activity.

Since a photocatalyst material disclosed in Patent Literature 2 is configured such that part of the surface of the tungsten oxide is not covered with the titanium oxide, the part is degraded by an alkaline solution. This causes the photocatalyst material disclosed in Patent Literature 2 also to dissolve or change in quality as is the case of a photocatalyst material in which a tungsten oxide is not covered with a titanium oxide.

A conventional photocatalyst material containing a tungsten oxide thus has low alkali resistance, and applications of such a photocatalyst are limited.

The present invention has been made in view of the above problem, and it is an object of the present invention to provide a tungsten oxide based photocatalyst material having alkali resistance.

Solution to Problem

In order to solve the problem, a photocatalytic material in accordance with an aspect of the present invention is a photocatalytic material including: a core particle; and a shell layer with which a whole surface of the core particle is covered, the core particle being constituted by at least a tungsten oxide, and the shell layer being constituted by at least a titanium oxide.

Advantageous Effects of Invention

According to an aspect of the present invention, it is possible to provide a tungsten oxide based photocatalyst material which has alkali resistance.

DESCRIPTION OF EMBODIMENTS

Embodiment 1

Diligent study by the inventors has revealed that alkali resistance of a tungsten oxide based photocatalyst material significantly improves by fully covering, with a shell layer containing a titanium oxide, the material's core particle containing a tungsten oxide. It was also revealed that, although the core particle of the photocatalyst material is fully covered with the shell layer, the photocatalyst material has photocatalytic activity equal to or higher than that of a photocatalyst material whose core particle is not covered with a shell layer. In addition, it was further revealed that a photocatalyst material having a high level of photocatalytic activity can be gained by controlling a weight proportion of the shell layer to the core particle.

Figure 1:
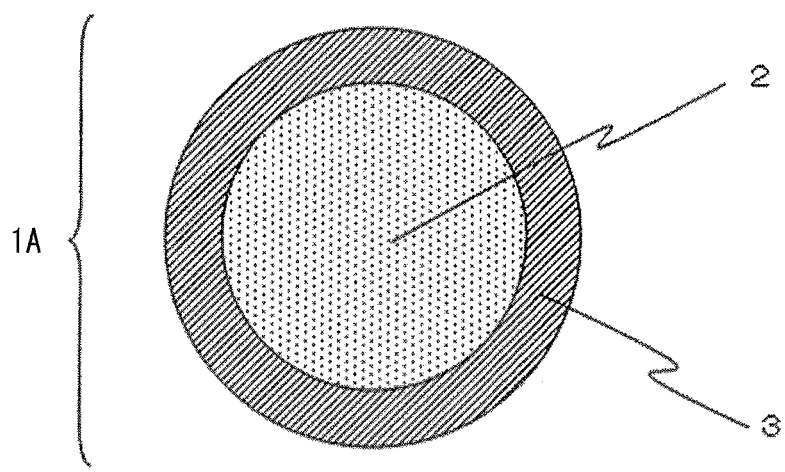
FIG. 1 is a cross-sectional view schematically illustrating a photocatalyst material in accordance with Embodiment 1 of the present invention.

The following description will discuss an embodiment of the present invention with reference to FIG. 1. FIG. 1 is a cross-sectional view schematically illustrating a photocatalyst material 1A in accordance with Embodiment 1.

The photocatalyst material 1A of Embodiment 1 includes at least one core particle 2 and a shell layer 3 with which the at least one core particle 2 is fully covered.

Each of the at least one core particle 2 contains at least a tungsten oxide.

The tungsten oxide constituting the core particle 2 can be produced by a typical method. Examples of the typical method encompass (i) a method in which ammonium paratungstate (APT) is thermally decomposed and (ii) a method in which a metal tungsten powder is heated in an oxygen atmosphere. In a case where a particle size distribution of the tungsten oxide obtained by the typical method is large, tungsten oxide particles having large particle size is to be removed by use of a proper filter so that a tungsten oxide having small particle size is obtained. The tungsten oxide thus having small particle size is to be used for producing the photocatalyst material 1A.

The tungsten oxide constituting the core particle 2 only needs to exhibit photocatalytic activity by irradiation of visible light. Examples of the tungsten oxide encompass $WO_3$, $W_{25}O_{73}$, $W_{20}O_{58}$, and $W_{24}O_{68}$.

Examples of a method of forming the shell layer 3 on a surface of the core particle 2 encompass (i) a method in which a titanium oxide layer is grown on a surface of a tungsten oxide particle by adding a solution containing a titanium oxide precursor to a solution in which tungsten oxide particles each serving as a core particle 2 are dispersed and (ii) a method in which a titanium oxide layer is deposited on a surface of a tungsten oxide particle by adding tungsten oxide particles to a solution containing a titanium oxide precursor so as to volatilize a solvent in the solution.

Examples of the titanium oxide precursor described above encompass: alkoxides such as titanium tetraisopropoxide; complexes such as titanium acetylacetonate and titanium lactate; and aqueous solutions such as titanium chloride and titanium sulfide.

The shell layer 3 preferably contains a crystalline titanium oxide gained by heating after a shell layer is formed. The titanium oxide contained in the shell layer 3 is preferably of an anatase type or of a rutile type, or is a mixture of titanium oxides of these types. A crystalline titanium oxide densifies the shell layer 3 more than a non-crystalline titanium oxide does. Therefore, a photocatalyst material, which includes a shell layer 3 constituted by a crystalline titanium oxide, has alkali resistance higher than a photocatalyst material which includes a shell layer 3 constituted by a non-crystalline titanium oxide. A titanium oxide of an anatase type can be obtained by heating titanium oxide in atmosphere at 400° C. or higher. A titanium oxide of a rutile type can be obtained by heating titanium oxide at 900° C. or higher.

In order for the photocatalyst material 1A of the present invention to be put to general use as a photocatalyst material having alkali resistance, it is preferable that the photocatalyst material 1A has an alkali resistance of 50% or greater, and it is more preferable that the photocatalyst material 1A further has a gas decomposition rate ratio of 50% or greater.

The "alkali resistance" herein refers to a residual rate of the photocatalyst material 1A after the photocatalyst material 1A is subjected to an alkali resistant treatment. More concretely, the alkali resistance refers to a value calculated by (Wa−Wb)/Wa×100 where (i) a weight of the photocatalyst material 1A before the alkali resistance treatment is Wa and (ii) a weight of the photocatalyst material 1A after the alkali resistance treatment is Wb. The alkali resistance treatment is performed by, for example, immersing, for 24 hours, the photocatalyst material 1A in a sodium hydroxide aqueous solution having a concentration of 1 mol/liter (demonstrated in the examples described later).

The gas decomposition rate ratio refers to a ratio of Vb to Va, where (i) Va is a gas decomposition rate of a photocatalyst material solely including the core particle 2 (not covered with the shell layer 3) and (ii) Va is a gas decomposition rate of the photocatalyst material 1A including the core particle 2 and the shell layer 3 with which the core particle 2 is covered. Specifically, the gas decomposition rate ratio is a value calculated by Vb/Va×100. A gas for calculating the gas decomposition rate ratio only needs to be a gas which can be decomposed by a photocatalyst. Examples of the gas encompass acetaldehyde, formaldehyde, and ammonia, which were used in the examples (described later).

Note that, instead of the gas decomposition rate ratio, a gas decomposition rate constant can be used for measuring ability of photocatalytic activity. The gas decomposition rate constant is defined by a gradient of a logarithmic graph showing a change over time in a remaining amount of gas decomposed by the photocatalyst material 1A (Horizontal axis: elapsed time, Vertical axis: remaining amount of gas). A gas used for calculating the gas decomposition rate constant is similar to a gas used for calculating the gas decomposition rate ratio.

Figure 4:
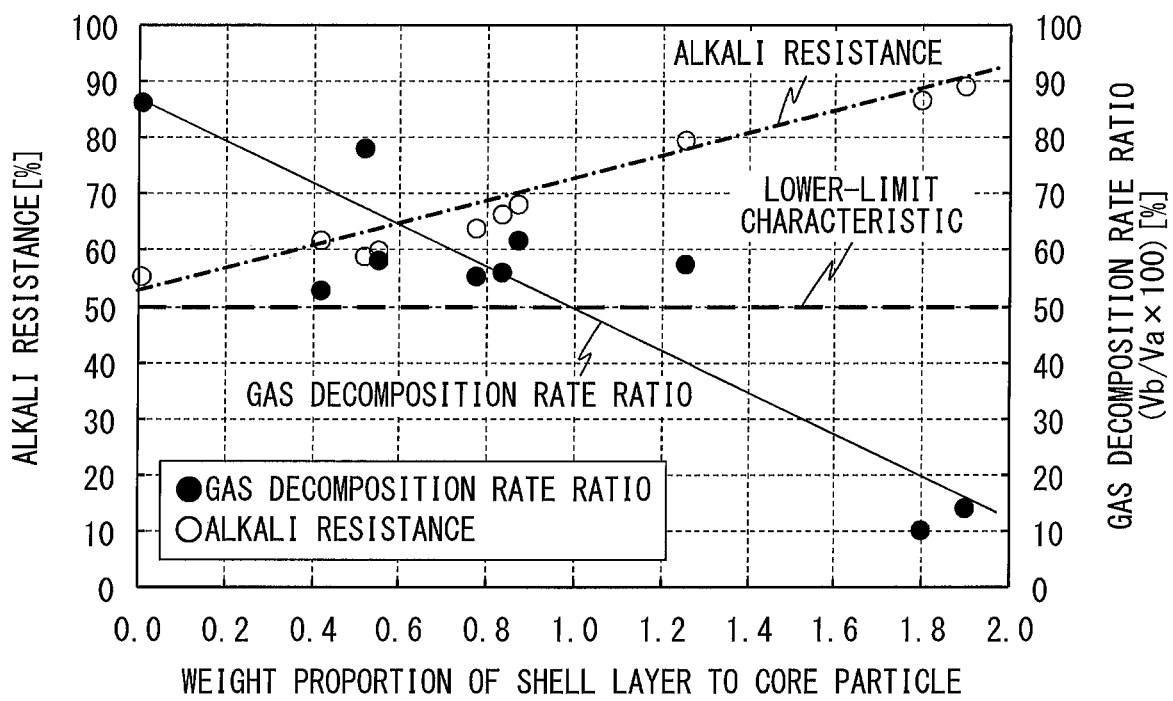
FIG. 4 is a graph showing correlations, according to photocatalyst materials produced in Example 4, between (i) weight proportions of shell layers to core particles and alkali resistances and (ii) the weight proportions and gas decomposition rate ratios.

In Example 4, the inventors of the present invention produced photocatalyst materials 1A in which core particles 2 of various sizes are covered with the shell layers 3 of various thicknesses (described later). FIG. 4 is a graph showing measurement results, according to the photocatalyst materials 1A in Example 4, of correlations between (i) weight proportions of the shell layers 3 to the core particles 2 and corresponding alkali resistances and (ii) the weight proportions and corresponding gas decomposition rate ratios. The weight proportion of a shell layer 3 to a core particle 2 is a value calculated by (Wcs−Wc)/Wc, where (i) a weight of the core particle 2 is Wc and (ii) a weight of a photocatalyst material 1A after the shell layer 3 is formed is Wcs. The weight proportion of a shell layer 3 to a core particle 2 can also be calculated by composition analysis of the photocatalyst material 1A, which composition analysis employs XPS (X-ray Photoelection Spectroscopy), NMR (Nuclear Magnetic Resonance) or the like.

As illustrated in FIG. 4, a photocatalyst material 1A, in which a weight proportion of a shell layer 3 to a core particle 2 is 1.0 or less, exhibits an alkali resistance of 50% or greater. A photocatalyst material 1A, in which a weight proportion of a shell layer 3 to a core particle 2 is 1.0 or less, exhibits such a sufficiently high gas decomposition rate ratio as 50% or greater. Note that a plot having a minimum weight proportion (Alkali resistance: approximately 55%, gas decomposition rate ratio: approximately 88%) in FIG. 4 shows a weight proportion of 0.01. Although not illustrated in FIG. 4, a photocatalyst material 1A in which a weight proportion is greater than 0 and less than 0.01 (a photocatalyst material in which a thin shell layer 3 covers a whole surface of a core particle 2) exhibits (i) an alkali resistance of 50% or greater and less than 55% and (ii) a gas decomposition rate ratio of greater than 88% and smaller than 100%. Meanwhile, a photocatalyst material in which a weight proportion of a shell layer 3 to a core particle 2 is 0 (a photocatalyst material in which the shell layer does not exist) exhibits an alkali resistance of approximately 0. This is because such a photocatalyst material cannot prevent the core particle from contacting an alkali.

In contrast, in a case where the weight proportion of the shell layer 3 to the core particle 2 is greater than 1.0, the shell layer 3 is so thick that alkali resistance is sufficiently high. Meanwhile, the gas decomposition rate ratio is smaller than 50% in such a case.

Therefore, in order to obtain a photocatalyst material 1A bringing about a lower-limit characteristic shown in FIG. 4 (Alkali resistance is 50% or greater, and gas decomposition rate is 50% or greater) or greater, the weight proportion of the shell layer 3 to the core particle 2 is preferably 1.0 or less. Note that since the photocatalyst material 1A includes the shell layer 3, the weight proportion of the shell layer 3 to the core particle 2 inevitably becomes greater than 0.

Note that the inventors of the present invention through experiments confirmed that, for securing an alkali resistance of a certain value or greater (for example, approximately 55% or greater), the weight proportion of the shell layer 3 to the core particle 2 is preferably 0.01 or greater. Even in a case where the weight proportion is smaller than 0.01, it is still possible to secure an alkali resistance of approximately 50% as long as the weight proportion is greater than 0, in other words, as long as the shell layer covering the whole core particle 2 exists. However, in order to secure an alkali resistance of approximately 55% or greater, the weight proportion is preferably 0.01 or greater, more preferably 0.01 or greater and 1.0 or less.

Embodiment 2

Figure 2:
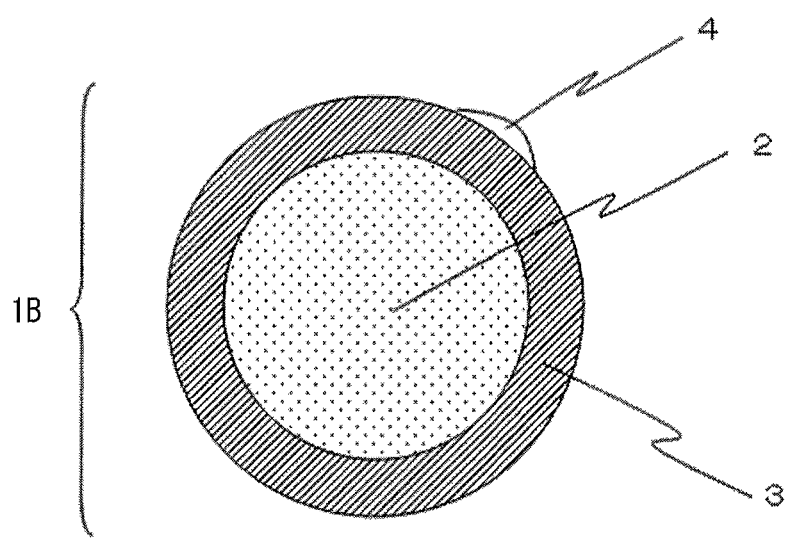
FIG. 2 is a cross-sectional view schematically illustrating a photocatalyst material in accordance with Embodiment 2 of the present invention.

Next, the following description will discuss another embodiment of the present invention with reference to FIG. 2. FIG. 2 is a cross-sectional view schematically illustrating a photocatalyst material 1B in accordance with Embodiment 2. Note that, for convenience, members identical in function to those of the respective members described in Embodiment 1 are given respective identical reference numerals, and a description of those members will be omitted.

As illustrated in FIG. 2, the photocatalyst material 1B in accordance with Embodiment 2 is identical to the photocatalyst material 1A except that, on a surface of a shell layer 3 of the photocatalyst material 1B, a co-catalyst 4 constituted by a metal or a metal compound is provided.

Since the photocatalyst material 1B in accordance with Embodiment 2 includes the co-catalyst 4 on the surface of the shell layer 3, photocatalytic activity of the material 1B can be improved. Examples of a metal which constitutes the co-catalyst 4 encompass copper, platinum, palladium, iron, silver, gold, nickel, ruthenium, iridium, niobium, and molybdenum. Examples of a metal compound which constitutes the co-catalyst 4 encompass compounds of metals constituting the co-catalyst 4, such as chloride, bromide, iodide, oxide, hydroxide, sulfate, nitrate, carbonate, phosphate, and organic salt.

Examples of a method of forming, on the surface of the shell layer 3, the co-catalyst 4 constituted by a metal or a metal compound encompass: (i) a method in which particles constituting the shell layer 3 are kneaded with particles of a metal constituting the co-catalyst 4 or with particles of a metal compound constituting the co-catalyst 4 and (ii) a method in which a metal constituting the co-catalyst 4 or a metal compound constituting the co-catalyst 4 are deposited on the surface of the shell layer 3 by (a) adding particles constituting the shell layer 3 to a solution containing the metal or the metal compound and then (b) heating the solution or irradiating the solution with light.

An adding amount of the metal or the metal compound for forming the co-catalyst 4 (in other words, an amount of the co-catalyst 4 supported on the surface of the shell layer 3) is preferably 0.01 wt % to 3 wt % with respect to the tungsten oxide constituting the core particle 2. In a case where the co-catalyst 4 is formed by a metal compound, the adding amount of the metal compound (the amount of the co-catalyst 4 supported) indicates an amount of metal in the metal compound. In a case where the adding amount of the metal or the metal compound is less than 0.01 wt %, an effect of the co-catalyst 4 becomes small. This prevents efficient photocatalytic activity from being obtained. In a case where the adding amount of the metal or the metal compound is greater than 3 wt %, an amount of the co-catalyst 4 covering the surface of the shell layer 3 becomes large. This causes an area of the shell layer 3, which area is exposed to an atmosphere, to be small, and therefore prevents efficient photocatalytic activity from being obtained.

Embodiment 3

Figure 3:
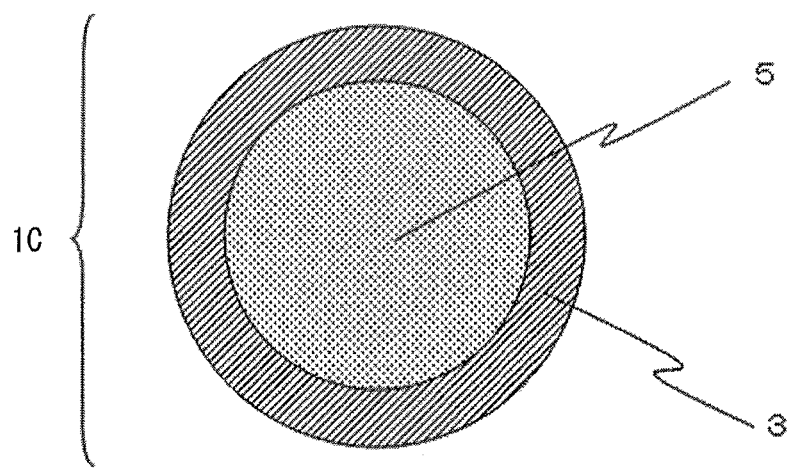
FIG. 3 is a cross-sectional view schematically illustrating a photocatalyst material in accordance with Embodiment 3 of the present invention.

The following description will discuss yet another embodiment of the present invention with reference to FIG. 3. FIG. 3 is a cross-sectional view schematically illustrating a photocatalyst material 1C in accordance with Embodiment 3. As was the case of Embodiment 2, for convenience, members identical in function to those of the respective members described in Embodiment 1 are given respective identical reference numerals, and a description of those members will be omitted.

As illustrated in FIG. 3, the photocatalyst material 1C in accordance with Embodiment 3 is identical to the photocatalyst material of Embodiment 1 except that, the material 1C includes, instead of the core particle 2, a core particle 5 constituted by a mixture of a tungsten oxide and a copper oxide.

According to the mixture of the tungsten oxide and the copper oxide constituting the core particle 5, the copper oxide can absorb light having a wavelength region longer than that of light absorbed by the tungsten oxide. Concretely, while an absorption edge of the tungsten oxide is in the vicinity of 460 nm, an absorption edge of the copper oxide reaches such a long wavelength region as the vicinity of 620 nm. This allows the core particle 5 to absorb light having a wavelength region longer than that of light absorbed by the core particle 2 constituted by a tungsten oxide alone. Therefore, according to the photocatalyst material 1C of Embodiment 3, the photocatalytic activity while the material 1C is irradiated with visible light can be improved.

A weight proportion of the copper oxide to the tungsten oxide is preferably greater than 0.01 wt % and less than 100 wt %. If the weight proportion is less than 0.01 wt %, then an effect of mixing the copper oxide will not be produced. If the weight proportion is greater than 100 wt %, then an effect of mixing the tungsten oxide will not be produced.

Note that the photocatalyst materials 1A though 1C in accordance with Embodiments 1 through 3 can each be used in a form of a powder, can be used while being mixed in a resin, or can be used while being dispersed in a solvent.

[Summary]

In a first aspect of the present invention, a photocatalyst material 1A includes: a core particle 2; and a shell layer 3 with which a whole surface of the core particle 2 is covered, the core particle 2 containing at least a tungsten oxide, and the shell layer 3 being constituted by a titanium oxide.

According to the configuration, the photocatalyst material 1A includes i) the core particle 2 containing at least a tungsten oxide and ii) the shell layer 3 with which the whole surface of the core particle 2 is covered and which is constituted by a titanium oxide. This makes it possible to provide a tungsten oxide based photocatalyst material which has alkali resistance higher than that of a conventional photocatalyst material in which part of a tungsten oxide is not covered with a titanium oxide.

In a second aspect of the present invention, the photocatalyst material 1A is preferably configured such that in the first aspect of the present invention, the shell layer 3 is constituted by a crystalline titanium oxide.

According to the configuration, a crystalline titanium oxide densifies the shell layer 3 more than a non-crystalline titanium oxide does. Therefore, the photocatalyst material, which includes the shell layer 3 constituted by the crystalline titanium oxide, can exhibit alkali resistance higher than that of a photocatalyst material which includes a shell layer constituted by a non-crystalline.

In a third aspect of the present invention, the photocatalyst 1A can be configured such that, in the second aspect of the present invention, the shell layer 3 is constituted by a titanium oxide of an anatase type.

In a fourth aspect of the present invention, a photocatalyst material 1B can be configured such that, in the first to third aspects of the present invention, a metal or a metal compound containing at least one of copper, platinum, palladium, iron, silver, gold, nickel, ruthenium, iridium, niobium, and molybdenum is provided on a surface of the shell layer 3.

According to the configuration, the metal or metal compound serves as a co-catalyst 4. This improves photocatalytic activity. Note that, an amount of the metal or the metal compound contained in the co-catalyst 4 supported by the surface of the sell layer 3 is preferably 0.01 wt % or greater and 3 wt % or less.

In a fifth aspect of the present invention, a photocatalyst material 1C is preferably configured such that, in the first to fourth aspects of the present invention, the core particle 5 contains a mixture of a tungsten oxide and a copper oxide and that an amount of the copper oxide contained in the core particle 5 is greater than 0.01 wt % and less than 100 wt % with respect to the tungsten oxide constituting the core particle 5.

A copper oxide can absorb light having a wavelength region longer than that of light absorbed by a tungsten oxide. Therefore, since the core particle 5 is constituted by the mixture of the tungsten oxide and the copper oxide, the photocatalyst material 1C exhibits high photocatalytic activity while being irradiated with visible light.

In sixth and seventh aspects of the present invention, the photocatalyst material 1A is configured such that, in the first to fifth aspects of the present invention, a weight proportion of the shell layer to the core particle is preferably 1.0 or less and more preferably 0.01 or greater and 1.0 or less. This makes it possible to provide a photocatalyst material which has alkali resistance and excellent photocatalytic activity.

The present invention is not limited to the description of the embodiment above, but may be altered by a skilled person within the scope of the claims. An embodiment based on a proper combination of technical means disclosed in different embodiments is encompassed in the technical scope of the present invention. Further, a new technical feature can be formed by combining technical measures disclosed in the embodiments.

EXAMPLES

Example 1

First, 0.05 g of tungsten oxide particles (Kishida Chemical Co., Ltd.) were added to 10 mL of ethanol (99.5%), and ultrasonic waves were applied for 10 minutes, so that the tungsten oxide particles were dispersed in the ethanol.

Then, 3 μL of titanium tetraisopropoxide (Kishida Chemical Co., Ltd.) was added to the resultant dispersion liquid while the dispersion liquid was being stirred at 1,000 rpm at room temperature.

Then, 0.3 mL of pure water was added to the resultant dispersion liquid, and the dispersion liquid was stirred at 1,000 rpm for 10 minutes at room temperature.

Then, a powder was separated from the dispersion liquid by centrifugal separation at 4,000 rpm for 10 minutes. Then, the powder was washed with ethanol several times, and was then heated at 100° C. for one hour, so that a solvent was volatized.

The resultant powder was baked at 500° C. in an atmosphere for 30 minutes, so that tungsten oxide particles, which were covered with crystalline titanium oxides (of anatase types), were obtained.

A weight of the photocatalyst materials obtained was 0.0900 g. This means that a weight proportion of a shell layer (titanium oxide) to a corresponding core particle (tungsten oxide) was 0.80.

Then, the tungsten oxide particles, which were covered with crystalline titanium oxides and which were obtained as the photocatalyst materials of Example 1, were immersed in a 1 mol/L sodium hydroxide aqueous solution for 24 hours. Meanwhile, tungsten particles, which were not covered with titanium oxides and which served as photocatalyst materials of the comparative example, were immersed in a 1 mol/L sodium hydroxide aqueous solution for 24 hours. As a result, 71.3 wt % of the particles of the photocatalyst materials of Example 1 remained without dissolving in the solution. On the other hand, 4.7 wt % of the particles of the photocatalyst materials of the comparative example remained without dissolving in the solution.

Further, an acetaldehyde decomposition rate constant of the photocatalyst materials of Example 1 was 0.5[/h] during irradiation by use of a blue LED (wave length: 450 nm, 7 mW/cm$^2$), while an acetaldehyde decomposition rate constant of the photocatalyst materials of the comparative example was 0.3[/h] during irradiation by use of the blue LED. The photocatalyst materials of Example 1 thus exhibited photocatalytic activity superior to that of the photocatalyst materials of the comparative example. Note that the decomposition rate constant is herein defined by a gradient of a logarithmic graph showing a change over time in a remaining amount of acetaldehyde (Horizontal axis: elapsed time, Vertical axis: remaining amount of acetaldehyde).

The above findings indicate that a tungsten oxide based photocatalyst material having alkali resistance and excellent photocatalytic activity can be obtained.

Example 2

First, 0.05 g of tungsten oxide particles (Kishida Chemical Co., Ltd.) were added to 10 mL of ethanol (99.5%), and ultrasonic waves were applied for 10 minutes, so that the tungsten oxide particles were dispersed in the ethanol.

Then, 3 μL of titanium tetraisopropoxide (Kishida Chemical Co., Ltd.) was added to the resultant dispersion liquid while the dispersion liquid was being stirred at 1,000 rpm at room temperature.

Then, 0.3 mL of pure water was added to the dispersion liquid, and then the dispersion liquid was stirred at 1,000 rpm for 10 minutes at room temperature.

Then, a powder was separated from the dispersion liquid by centrifugal separation at 4,000 rpm for 10 minutes. Then, the powder was washed with ethanol several times, and was then heated at 100° C. for one hour, so that a solvent was volatized.

The resultant powder was baked at 500° C. in an atmosphere for 30 minutes, so that tungsten oxide particles, which were covered with crystalline titanium oxides (of anatase types), were obtained.

To the tungsten oxide particles thus obtained, palladium particles (Kishida Chemical Co., Ltd.) were added in a proportion of 0.1 wt % with respect to the tungsten oxide particles, and then the palladium particles and the tungsten oxide particles were kneaded together in a mortar. This caused tungsten oxide particles, which were covered with crystalline titanium tungsten oxides and which supported palladium, to be obtained as photocatalyst materials of Example 2.

A weight of the photocatalyst materials obtained was 0.0910 g. This means that a weight proportion of a shell layer (titanium oxide) to a corresponding core particle (tungsten oxide) was 0.82.

Then, the photocatalyst materials of Example 2 were immersed in a 1 mol/L sodium hydroxide aqueous solution for 24 hours. Meanwhile, the photocatalyst materials of the comparative example were immersed in a 1 mol/L sodium hydroxide aqueous solution for 24 hours. As a result, 71.5 wt % of the particles of the photocatalyst materials of Example 2 remained without dissolving in the solution. On the other hand, 4.7 wt % of the particles of the photocatalyst materials of the comparative example remained without dissolving in the solution.

Further, an acetaldehyde decomposition rate constant of the photocatalyst materials of Example 2 was 1.5[/h] during irradiation by use of a blue LED (wave length: 450 nm, 7 mW/cm$^2$), while an acetaldehyde decomposition rate constant of the photocatalyst materials of the comparative example was 0.3[/h] during irradiation by use of the blue LED. The photocatalyst materials of Example 2 thus exhibited photocatalytic activity superior to that of the photocatalyst materials of the comparative example. Note that the decomposition rate constant is herein defined by a gradient of a logarithmic graph showing a change over time in a remaining amount of acetaldehyde (Horizontal axis: elapsed time, Vertical axis: remaining amount of acetaldehyde).

The above findings indicate that a tungsten oxide based photocatalyst material having alkali resistance and excellent photocatalytic activity can be obtained.

Example 3

First, 0.04 g of tungsten oxide particles (Kishida Chemical Co., Ltd.) and 0.01 g of copper oxide (II) particles (Kishida Chemical Co., Ltd.) were added to 10 mL of ethanol (99.5%), and ultrasonic waves were applied for 10 minutes, so that the tungsten oxide particles and the copper oxide (II) particles were dispersed in the ethanol.

Then, 3 μL of titanium tetraisopropoxide (Kishida Chemical Co., Ltd.) was added to the resultant dispersion liquid while the dispersion liquid was being stirred at 1,000 rpm at room temperature.

Then, 0.3 mL of pure water was added to the resultant dispersion liquid, and the dispersion liquid was stirred at 1,000 rpm for 10 minutes at room temperature.

Then, a powder was separated from the dispersion liquid by centrifugal separation at 4,000 rpm for 10 minutes. Then, the powder was washed with ethanol several times, and was then heated at 100° C. for one hour, so that a solvent was volatized.

The resultant powder was baked at 500° C. in an atmosphere for 30 minutes, so that mixed particles of tungsten oxides and copper oxides, which mixed particles were covered with crystalline titanium oxides (of anatase types) and served as photocatalyst materials of Example experiment 3, were obtained.

A weight of the photocatalyst materials obtained was 0.0905 g. This means that a weight proportion of a shell layer (titanium oxide) to a corresponding core particle (mixed particle of tungsten oxide and copper oxide) was 0.81.

Then, the photocatalyst materials of Example 3 were immersed in a 1 mol/L sodium hydroxide aqueous solution for 24 hours. Meanwhile, the photocatalyst materials of the comparative example were immersed in a 1 mol/L sodium hydroxide aqueous solution for 24 hours. As a result, 71.0 wt % of the particles of the photocatalyst materials of Example 3 remained without dissolving in the solution. On the other hand, 4.7 wt % of the particles of the photocatalyst materials of the comparative example remained without dissolving in the solution.

Further, an acetaldehyde decomposition rate constant of the photocatalyst materials of Example 3 was 0.7[/h] during irradiation by use of a blue LED (wave length: 450 nm, 7 mW/cm$^2$), while an acetaldehyde decomposition rate constant of the photocatalyst materials of the comparative example was 0.3[/h] during irradiation by use of the blue LED. The photocatalyst materials of Example 3 thus exhibited photocatalytic activity superior to that of the photocatalyst materials of the comparative example. Note that the decomposition rate constant is herein defined by a gradient of a logarithmic graph showing a change over time in a remaining amount of acetaldehyde (Horizontal axis: elapsed time, Vertical axis: remaining amount of acetaldehyde).

The above findings indicate that a tungsten oxide based photocatalyst material having alkali resistance and excellent photocatalytic activity can be obtained.

Example 4

Steps similar to those in Example 1 were performed, except that various amounts of titanium tetraisopropoxides (Kishida Chemical Co., Ltd.) were used, so that tungsten oxide particles (ten types of photocatalyst materials having respective weight proportions of a shell layer to a core particle), which were covered with crystalline titanium oxides (of anatase types), were obtained.

Each of the various types of photocatalyst materials thus obtained in Example 4 was immersed in a 1 mol/L sodium hydroxide aqueous solution for 24 hours so that alkali resistance of each photocatalyst material was measured. Further, an acetaldehyde gas decomposition rate ratio of each photocatalyst material was measured during irradiation by use of a blue LED (wave length: 450 nm, 7 mW/cm$^2$).

FIG. 4 is a graph showing correlations, according to the photocatalyst materials produced in Example 4, between (i) weight proportions of shell layers to core particles and corresponding alkali resistances and (iii) the weight proportions and corresponding gas decomposition rate ratios. The gas decomposition rate ratio was calculated by a ratio of a gas decomposition rate (Vb) of a photocatalyst material of Example 4 to a gas decomposition rate (Va) of the photocatalyst material of the comparative example (i.e. Gas decomposition rate ratio=Vb/Va×100). Note that a plot having a minimum weight proportion in FIG. 4 shows a weight proportion of 0.01, which is a weight proportion of a shell layer to a core particle.

The results shown FIG. 4, demonstrate that a photocatalyst material, in which a weight proportion of a shell layer to a core particle is greater than 0 and 0.1 or less, has an alkali resistance of 50% or greater and a gas decomposition rate ratio of approximately 90% or greater, and that a photocatalyst material, in which a weight proportion of a shell layer to a core particle is preferably 0.01 or greater and 1.0 or less, has an alkali resistance of 55% or greater and a gas decomposition rate ratio of 50% or greater. That is, it was demonstrated that such a photocatalyst material falling within the above range of weight proportions of a shell layer to a core particle is a tungsten oxide based photocatalyst material having alkali resistance and excellent photocatalytic activity.

INDUSTRIAL APPLICABILITY

The present invention exhibits high catalytic activity in response to visible light. This allows the present invention to be used as a visible light response type photocatalyst functional product. The photocatalyst functional product includes, on a surface of a base material of the product, a photocatalyst body layer made of the photocatalyst material of the present invention, and has a functional to adsorb environmental pollutants and to decompose and remove the pollutants by visible light. Concretely, examples of the functional product encompass, (i) building materials such as a ceiling material, a tile, a glass, a wall paper, a wall material, a flooring material, (ii) interior material for automobiles, (iii) home electric appliances such as a refrigerator, an air-conditioner, and (iv) fiber products such as clothing and a curtain.

Further, the photocatalyst material of the present invention has alkali resistance, and is therefore applicable particularly to a photocatalyst functional product which is used for decomposing a basic gas such as ammonia or which is used while being in contact with a basic cleaning agent.

REFERENCE SIGNS LIST 1A, 1B, 1C Photocatalyst material
2 Core particle
3 Shell layer
4 Co-catalyst
5 Core particle

The invention claimed is:

1. A visible light response type photocatalyst material comprising:
a core particle; and
a shell layer with which a whole surface of the core particle is fully covered,
the core particle containing at least a tungsten oxide, and
the shell layer being constituted by a titanium oxide, wherein
the visible light response type photocatalyst material undergoes photocatalytic activity when irradiated with visible light,
a weight proportion of the shell layer to the core particle is 0.4 or greater and 0.9 or less.

2. The visible light response type photocatalyst material as set forth in claim 1, wherein:
the shell layer is constituted by a crystalline titanium oxide.

3. The visible light response type photocatalyst material as set forth in claim 1, wherein: a metal or a metal compound containing at least one of copper, platinum, palladium, iron, silver, gold, nickel, ruthenium, iridium, niobium, and molybdenum is provided on a surface of the shell layer.

4. The visible light response type photocatalyst material as set forth in claim 3, wherein: an amount of a metal contained in the metal or in the metal compound is 0.01 wt % or greater and 3 wt % or less with respect to the tungsten oxide contained in the core particle.

5. The visible light response type photocatalyst material as set forth in claim 1, wherein: the core particle contains a mixture of a tungsten oxide and a copper oxide.

6. The visible light response type photocatalyst material as set forth in claim 5 wherein: an amount of the copper oxide contained in the core particle is greater than 0.01 wt % and less than 100 wt % with respect to the tungsten oxide contained in the core particle.

7. A method of producing a visible light response type photocatalyst material,
said visible light response type photocatalyst material comprising:
a core particle; and
a shell layer with which a whole surface of the core particle is fully covered, said method comprising:
growing, by adding a solution containing a titanium oxide precursor to a solution in which at least tungsten oxide particles each serving as the core particle are dispersed, a titanium oxide layer on a whole surface of at least one of the tungsten oxide particles, wherein
the visible light response type photocatalyst material undergoes photocatalytic activity when irradiated with visible light,
a weight proportion of the shell layer to the core particle is 0.4 or greater and 0.9 or less.

* * * * *